United States Patent
Kashima

(10) Patent No.: US 10,019,752 B2
(45) Date of Patent: Jul. 10, 2018

(54) SHOPPING MALL SYSTEM, TERMINAL, METHOD, AND MEDIUM FOR ESTIMATING THAT WARNING INFORMATION HAS BEEN READ

(71) Applicant: Rakuten, Inc., Tokyo (JP)

(72) Inventor: Rei Kashima, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 451 days.

(21) Appl. No.: 14/784,065

(22) PCT Filed: Mar. 3, 2014

(86) PCT No.: PCT/JP2014/055283
§ 371 (c)(1),
(2) Date: Oct. 13, 2015

(87) PCT Pub. No.: WO2015/132858
PCT Pub. Date: Sep. 11, 2015

(65) Prior Publication Data
US 2016/0071195 A1     Mar. 10, 2016

(51) Int. Cl.
G06Q 30/00        (2012.01)
G06Q 30/06        (2012.01)

(52) U.S. Cl.
CPC ......... *G06Q 30/0641* (2013.01); *G06Q 30/06* (2013.01); *G06Q 30/0623* (2013.01); *G06Q 30/0635* (2013.01)

(58) Field of Classification Search
None
See application file for complete search history.

(56) References Cited

U.S. PATENT DOCUMENTS

| 2010/0286998 A1* | 11/2010 | Picken | G06Q 30/02 |
| | | | 705/2 |
| 2012/0117467 A1* | 5/2012 | Maloney | G06Q 10/00 |
| | | | 715/273 |

(Continued)

FOREIGN PATENT DOCUMENTS

JP     2012-248165 A     12/2012

OTHER PUBLICATIONS

Riley, Michael W., Desiging and Evaluating Warning Labels, Sep. 1, 1982, IEEE Transaction on Professional Communication, vol. 3, p. 127-130.*

(Continued)

*Primary Examiner* — William Allen
*Assistant Examiner* — Timothy Kang
(74) *Attorney, Agent, or Firm* — Sughrue Mion, PLLC

(57)     ABSTRACT

A display (1203) displays product information acquired from a server in a scrollable manner. An estimator (1204) estimates whether or not a user has read warning information included in the product information. If it is estimated that the warning information has been read, and an order object included in the product information is operated by the user, a notifier (1205) notifies an electronic shopping mall server (10) of a purchase order by the user for the product related to the product information. The display (1203) displays a first object superimposed onto the product information while it is estimated that the warning information has not been read, and if the first object is operated by the user, the display (1203) scrolls the product information so that the warning information is displayed. The display (1203) displays a second object superimposed onto the product information after it is estimated that the warning information has been read, and if the second object is operated by the user, (Continued)

the display (1203) scrolls the product information so that the order object is displayed.

12 Claims, 19 Drawing Sheets

(56) References Cited

U.S. PATENT DOCUMENTS

| | | | |
|---|---|---|---|
| 2013/0027335 A1* | 1/2013 | Li | H04M 1/27455 345/173 |
| 2014/0089787 A1 | 3/2014 | Takami | |
| 2014/0279426 A1* | 9/2014 | Holman | G06Q 30/0207 705/39 |

OTHER PUBLICATIONS

English Translation of the Written Opinion of the International Searching Authority, dated Mar. 6, 2014, International Seaching Authority.*

\* cited by examiner

| PRODUCT CODE | PRODUCT NAME | STOCK | UNIT PRICE | TYPE | ... |
|---|---|---|---|---|---|
| 23456 | ○○ COLD MEDICINE | 500 | ¥1000 | SPECIAL | ... |
| 23789 | ×× DIGESTIVE MEDICINE | 1000 | ¥1500 | SPECIAL | ... |
| 98765 | MINERAL WATER, 2L BOTTLE, PACK OF 6 | 200 | ¥600 | GENERAL | ... |
| 98799 | HOKKAIDO WHITE RICE, 10KG | 100 | ¥3980 | GENERAL | ... |
| ... | | | | ... | ... |

| USER ID | DATE AND TIME | PRODUCT CODE | QUANTITY | PAYMENT | DELIVERY | ... |
|---|---|---|---|---|---|---|
| abc@xxx.yyy.jp | 01/28/2014 12:30:45 | 12345 | 1 | CARD, PROCESSED | SENT | ... |
| abc@xxx.yyy.jp | 02/01/2014 12:41:27 | 20001 | 1 | CARD, PROCESSED | SENT | ... |
| zyx@aaa.bbb | 02/05/2014 23:55:10 | 59876 | 1 | BANK TRANSFER, PENDING | UNSENT | ... |
| ... | ... | ... | ... | ... | ... | ... |

| USER ID | UNREAD / READ | UPDATE TIME |
|---|---|---|
| abc@xxx.yyy.jp | ○ | 02/03/2014 09:20:10 |
| abc@xxx.yyy.jp | × | 01/30/2014 00:00:00 |
| zyx@aaa.bbb | × | 01/30/2014 00:00:00 |
| ... | ... | ... |

| PRODUCT CODE | UNREAD / READ | UPDATE TIME |
|---|---|---|
| 23456 | ○ | 02/03/2014 09:20:10 |
| 23789 | ○ | 02/04/2014 21:30:55 |
| ... | ... | ... |

FIG.18

SHOPPING MALL SYSTEM, TERMINAL, METHOD, AND MEDIUM FOR ESTIMATING THAT WARNING INFORMATION HAS BEEN READ

CROSS REFERENCE TO RELATED APPLICATIONS

This application is a National Stage of International Application No. PCT/JP2014/055283, filed on Mar. 3, 2014, the contents of all of which are incorporated herein by reference in their entirety.

TECHNICAL FIELD

The present disclosure relates to an electronic shopping mall system, a terminal, a display control method, a recording medium, and a program suited to encouraging a user to purchase a product while also providing the user with warning information to be notified before purchase of the product.

BACKGROUND ART

When displaying a public webpage on the Internet, if there is too much information on the webpage, the entire webpage may not be fully displayed at once. The user views the webpage by scrolling as appropriate.

Regarding the scrolling display of a webpage, Patent Literature 1 discloses an information processing device that, when specific content is pushed off-screen by scrolling, inserts and displays a copy of the specific content among the currently displayed information.

Meanwhile, on the Internet, there exist what are called electronic shopping malls that set up storefronts in a virtual space and sell various products to users. The amount of product information, including information such as a description of the product, tends to be large, and the user is often required to scroll when viewing the product information.

CITATION LIST

Patent Literature

Patent Literature 1: Unexamined Japanese Patent Application Kokai Publication No. 2012-248165

SUMMARY OF INVENTION

Technical Problem

Meanwhile, depending on the product, there may exist warning information that the seller should disclose or must disclose to the purchaser in advance. However, making the user read warning information in particular from among a large amount of product information is not easy. Also, if the user encounters a complex procedure to make the user read the warning information, there is risk that the user will become annoyed and cancel a purchase, leading to a possible loss of opportunities for the seller to sell the product.

The present disclosure has been devised in light of circumstances like the above, and takes as an objective to provide an electronic shopping mall system, a terminal, a display control method, a recording medium, and a program suited to encouraging a user to purchase a product while providing the user with warning information to be notified before purchase of the product.

Solution to Problem

An electronic shopping mall system according to a first aspect of the present invention includes:

a display that, on the basis of a request from a user, displays product information acquired from a server on a screen in a scrollable manner;

an estimator that estimates whether or not the user has read warning information included in the product information displayed on the screen; and a notifier that, when it is estimated that the warning information has been read, and in addition, an order object included in the product information displayed on the screen is operated by the user, notifies the server of a purchase order by the user for a product related to the product information;

wherein the display displays on the screen a first object superimposed onto the product information displayed on the screen while it is estimated that the warning information has not been read, and if the first object displayed on the screen is operated by the user, the display scrolls the product information so that the warning information is displayed on the screen, and the display displays on the screen a second object superimposed onto the product information displayed on the screen after it is estimated that the warning information has been read, and if the second object displayed on the screen is operated by the user, the display scrolls the product information so that the order object is displayed on the screen.

The display may also display the first object and the second object at a fixed position relative to the screen.

If the first object is operated by the user, the display may also scroll the product information so that the warning information is displayed on the screen, and remove the first object.

The display may also display the second object on the screen after removing the first object.

If it is estimated that the user has read the warning information, the display may also remove the first object, and display the second object at the same position as a position where the first object had been displayed.

The display may also not display the second object while the order object is being displayed, and display the second object while the order object is not being displayed.

If the user operates the order object while it is estimated that the warning information has not been read, the display may also scroll the product information so that the warning information is displayed on the screen.

Additionally, purchase history storage that stores a history of a product indicated by the product information and purchased by the user may be addition provided, and the estimator, on the basis of the history, may calculate a length of time elapsing since a time when the product was last purchased, and if the calculated length of time is equal to or greater than a predetermined length, the estimator estimates that the user has not read the warning information, whereas if the calculated length of time is less than the predetermined length, the estimator estimates that the user has read the warning information.

If the warning information is updated, the estimator may also estimate that the user has not read the warning information.

A terminal according to another aspect of the present invention includes:

a display that, on the basis of a request from a user, displays product information acquired from a server on a screen in a scrollable manner;

an estimator that estimates whether or not the user has read warning information included in the product information displayed on the screen; and a notifier that, when it is estimated that the warning information has been read, and in addition, an order object included in the product information displayed on the screen is operated by the user, notifies the server of a purchase order by the user for a product related to the product information;

wherein the display displays on the screen a first object superimposed onto the product information displayed on the screen while it is estimated that the warning information has not been read, and if the first object displayed on the screen is operated by the user, the display scrolls the product information so that the warning information is displayed on the screen, and the display displays on the screen a second object superimposed onto the product information displayed on the screen after it is estimated that the warning information has been read, and if the second object displayed on the screen is operated by the user, the display scrolls the product information so that the order object is displayed on the screen.

A display control method according to another aspect of the present invention includes:

displaying, on the basis of a request from a user, product information acquired from a server on a screen in a scrollable manner;

estimating whether or not the user has read warning information included in the product information displayed on the screen; and notifying, when it is estimated that the warning information has been read, and in addition, an order object included in the product information displayed on the screen is operated by the user, the server of a purchase order by the user for a product related to the product information;

wherein the displaying displays on the screen a first object superimposed onto the product information displayed on the screen while it is estimated that the warning information has not been read, and if the first object displayed on the screen is operated by the user, the displaying scrolls the product information so that the warning information is displayed on the screen, and the displaying displays on the screen a second object superimposed onto the product information displayed on the screen after it is estimated that the warning information has been read, and if the second object displayed on the screen is operated by the user, the displaying scrolls the product information so that the order object is displayed on the screen.

A computer-readable recording medium according to another aspect of the present invention stores a program causing a computer to function as:

a display that, on the basis of a request from a user, displays product information acquired from a server on a screen in a scrollable manner;

an estimator that estimates whether or not the user has read warning information included in the product information displayed on the screen; and a notifier that, when it is estimated that the warning information has been read, and in addition, an order object included in the product information displayed on the screen is operated by the user, notifies the server of a purchase order by the user for a product related to the product information;

wherein the display displays on the screen a first object superimposed onto the product information displayed on the screen while it is estimated that the warning information has not been read, and if the first object displayed on the screen is operated by the user, the display scrolls the product information so that the warning information is displayed on the screen, and the display displays on the screen a second object superimposed onto the product information displayed on the screen after it is estimated that the warning information has been read, and if the second object displayed on the screen is operated by the user, the display scrolls the product information so that the order object is displayed on the screen.

A program according to another aspect of the present invention causes a computer to function as:

a display that, on the basis of a request from a user, displays product information acquired from a server on a screen in a scrollable manner;

an estimator that estimates whether or not the user has read warning information included in the product information displayed on the screen; and a notifier that, when it is estimated that the warning information has been read, and in addition, an order object included in the product information displayed on the screen is operated by the user, notifies the server of a purchase order by the user for a product related to the product information;

wherein the display displays on the screen a first object superimposed onto the product information displayed on the screen while it is estimated that the warning information has not been read, and if the first object displayed on the screen is operated by the user, the display scrolls the product information so that the warning information is displayed on the screen, and the display displays on the screen a second object superimposed onto the product information displayed on the screen after it is estimated that the warning information has been read, and if the second object displayed on the screen is operated by the user, the display scrolls the product information so that the order object is displayed on the screen.

The above program may be distributed or sold via a computer communication network, independently of the computer on which the program is executed. In addition, the above recording medium may be a non-transitory recording medium, and may be distributed or sold independently of the computer.

Advantageous Effects of Invention

According to the present disclosure, it is possible to encourage a user to purchase a product while providing the user with warning information to be notified before purchase of the product.

BRIEF DESCRIPTION OF DRAWINGS

FIG. 3 is a diagram illustrating a structure of product information stored in a product database;

FIG. 4 is a diagram illustrating a structure of history data stored in a purchase history database;

FIG. 17 is a diagram illustrating a configuration of an unread/read table; and

FIG. 18 is a diagram illustrating another configuration of an unread/read table.

DESCRIPTION OF EMBODIMENTS

Embodiments of the present disclosure will be described. The embodiments hereinafter are for the purpose of explanation, and do not restrict the scope of the present disclosure. Consequently, although a person ordinarily skilled in the art may be able to adopt embodiments in which some or all of these elements have been substituted with their equivalents, such embodiments are also included in the scope of the present disclosure.

Embodiment 1

Figure 1:
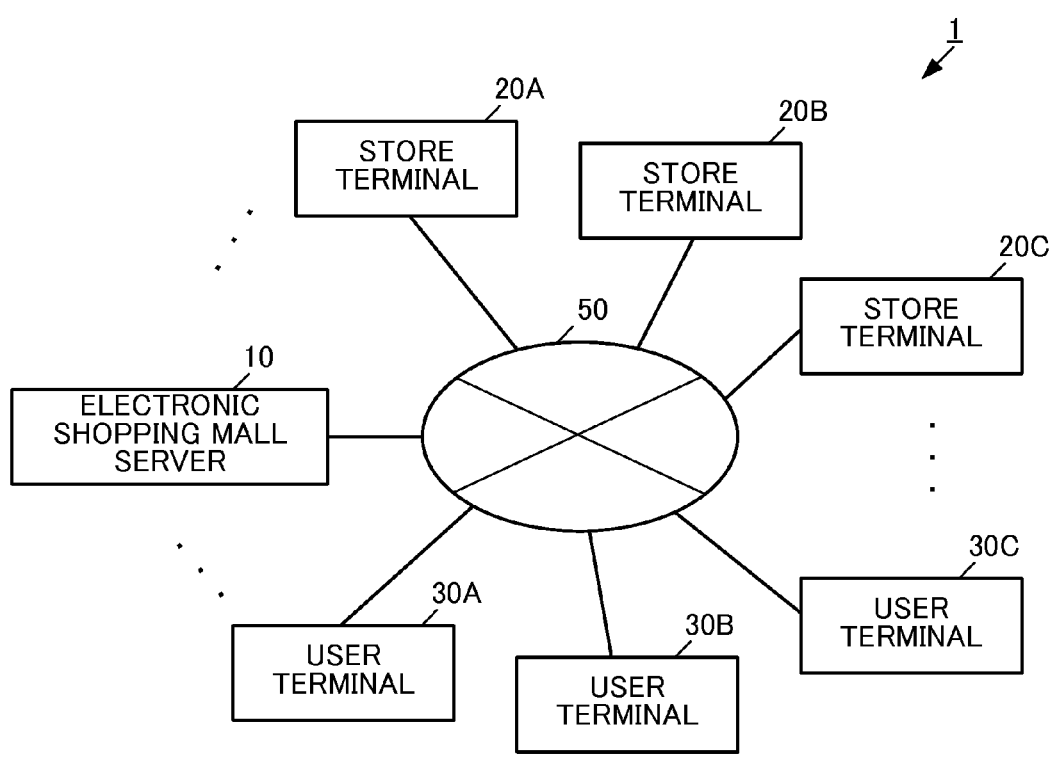
FIG. 1 is a diagram illustrating an overall configuration of an electronic shopping mall system.

First, an overall configuration of an electronic shopping mall system 1 according to the present embodiment will be described using FIG. 1. The electronic shopping mall system 1 includes an electronic shopping mall server 10, a store terminal 20 installed at one or more stores that set up a storefront in an electronic shopping mall (in FIG. 1, there are three store terminals 20A, 20B, and 20C), a user terminal 30 used by users who shop at the electronic shopping mall (in FIG. 1, there are three user terminals 30A, 30B, and 30C), and a communication network 50. In the present embodiment, the communication network 50 is the Internet.

The electronic shopping mall server 10 manages a virtual shopping mall on the Internet in which multiple stores participate. The electronic shopping mall server 10 is managed by an administrator of the electronic shopping mall. The number of stores participating in the electronic shopping mall is arbitrary. In the electronic shopping mall, various products and services are sold.

Hereinafter, for the sake of simplicity, products and services will be collectively designated "products", which may include intangible services such as hotel reservations, online tickets, and software licenses, for example.

The store terminal 20 is installed inside a store that sells products at the electronic shopping mall. A sales manager of the store operates the store terminal 20 to register product information indicating products sold by that store in the electronic shopping mall server 10.

Specifically, the product information may include information such as a product code identifying the product, the name of the product, an image of the product, a description of the product, the quantity of the product in stock, the unit sale price of the product, the size of the product, the weight of the product, the shipping fee for the product, an image of the product, and a date when a service is provided, for example. The content of the product information differs for each product.

The product information also includes warning information to be notified to the user before selling to the user. The warning information may be information such as a usage warning for a medical product, terms of cancellation for a hotel reservation, recommended system requirements for digital content, or a member agreement, for example.

In the present embodiment, the products sold at the electronic shopping mall include a product that cannot be purchased until after the user has read the warning information (that is, a special product). The user is unable to purchase a special product until after reading the warning information.

For a special product, the electronic shopping mall server 10 accepts a purchase order for the product after it is estimated that the user has read the warning information. The estimation of whether or not warning information has been read will be discussed in detail later.

Note that for a product that is not a special product (that is, a general product), the product information may also not include warning information. Alternatively, for a general product, even if warning information exists, the electronic shopping mall server 10 may accept a purchase order regardless of whether or not the user has read the warning information.

The electronic shopping mall server 10 stores product information expressing the product sold at the electronic shopping mall, and transmits product information to a user terminal 30 with an access request.

The product information is provided to the user terminal 30 via a webpage accessible from the user terminal 30. The webpage may be made up of information such as HTML (HyperText Markup Language) data, image data, and audio data. The webpage may also be in a format other than the HTML format, such as XML (Extensible Markup Language) format or XHTML (Extensible HyperText Markup Language) format. Alternatively, the product information may be provided to the user terminal 30 by using a dedicated application provided by the electronic shopping mall and installed on the user terminal 30.

The user terminal 30 is operated by a user who purchases a product offered for sale at the electronic shopping mall. The user operates the user terminal 30 to access the electronic shopping mall, views a product, and purchases a product.

The communication network 50 interconnects the electronic shopping mall server 10, the store terminal 20, and the user terminal 30. The communication network 50 is typically the Internet, but may also include a phone line, a dedicated line, or a LAN (Local Area Network), for example.

Figure 2:
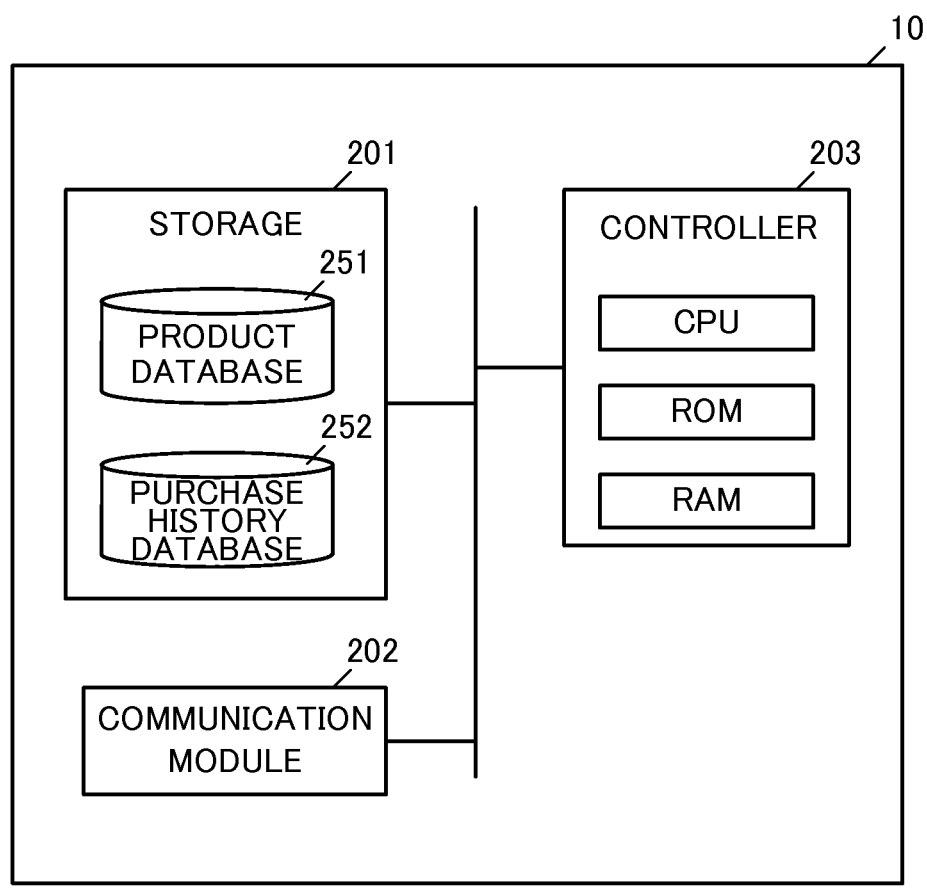
FIG. 2 is a diagram illustrating a hardware configuration of an electronic shopping mall server.

Next, a hardware configuration of the electronic shopping mall server 10 will be described using FIG. 2. The electronic shopping mall server 10 is equipped with storage 201, a communication module 202, and a controller 203.

The storage 201 is made up of a storage device such as a hard disk. The storage 201 stores a product database 251. The product database 251 stores product information for all products offered for sale at the electronic shopping mall.

FIG. 3 illustrates an exemplary structure of product information stored in the product database 251. The product database 251 stores various data indicating the attributes of a product, such as a product name, stock count, unit price, and a type indicating special product or general product, in association with a product code that identifies the product. The product information is updated as needed by a store terminal 20 operated by a manager of a store that sells products, or by the electronic shopping mall server 10.

The storage 201 also stores a purchase history database 252. The purchase history database 252 stores, for each user ID indicating a user, data indicating the products purchased by that user. When there is a purchase order for a product from a user terminal 30, the controller 203 adds a record indicating the purchase history of that product to the purchase history database 252. In addition, the controller 203 updates information such as payment status and product delivery status as needed.

FIG. 4 illustrates an exemplary structure of history data stored in the purchase history database 252. The purchase history database 252 stores information such as the date and time a product was purchased (the date and time a purchase order was accepted), a product code, data indicating the quantity of the product, data indicating fee payment status, and data indicating product delivery status, in association with a user ID.

In the present embodiment, the user ID is an email address possessed by a user and registered in the electronic shopping mall server 10 in advance. However, information such as a unique character string, numerical sequence, or a combination thereof assigned to each user may also be used instead of an email address, insofar as a user may be uniquely identified.

The communication module 202 is equipped with a NIC (Network Interface Card), connects the electronic shopping mall server 10 to the communication network 50, and communicates with the store terminal 20 and the user terminal 30.

The controller 203 is equipped with components such as a CPU (Central Processing Unit), ROM (Read Only Memory), and RAM (Random Access Memory), and controls the electronic shopping mall server 10 overall.

For the electronic shopping mall server 10, a device such as a typical computer server, mainframe, or cloud server may be used.

Figure 5:
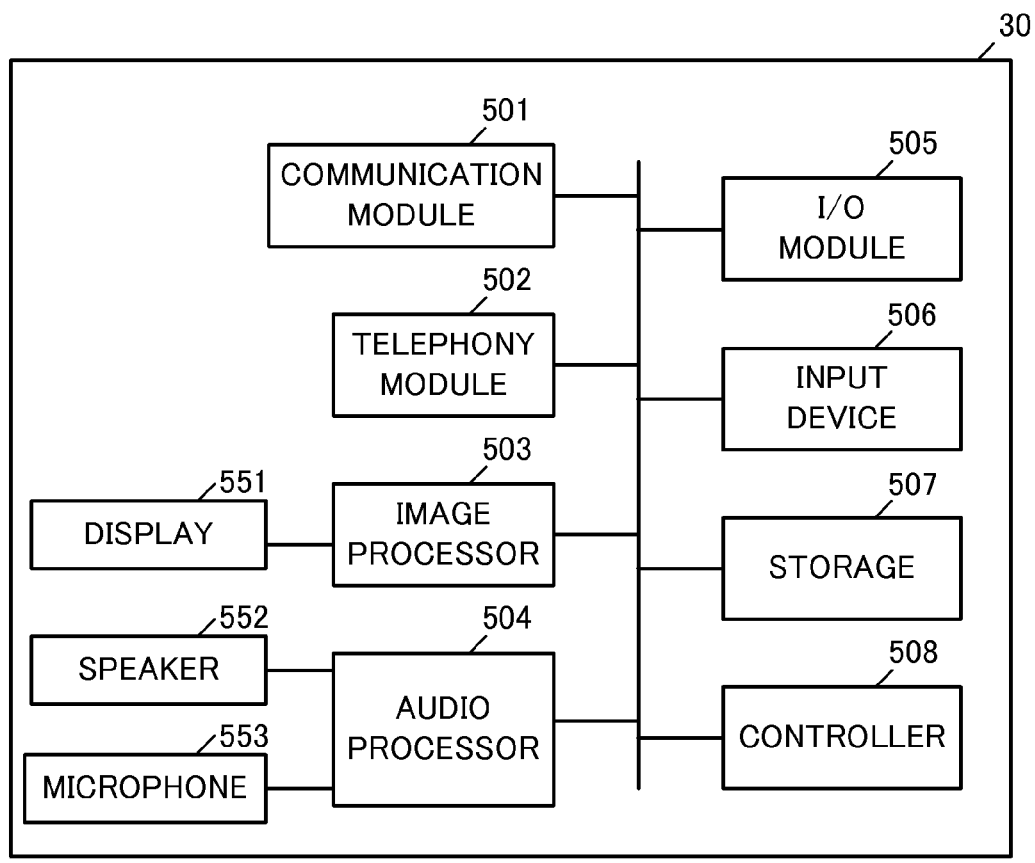
FIG. 5 illustrates a hardware configuration of a user terminal.

Next, a hardware configuration of the user terminal 30 will be described using FIG. 5. The user terminal 30 is equipped with a communication module 501, a telephony module 502, an image processor 503, an audio processor 504, an I/O (Input/Output) module 505, an input device 506, storage 507, and a controller 508.

The communication module 501 is equipped with a NIC, connects the user terminal 30 to the communication network 50, and communicates with the electronic shopping mall server 10.

The telephony module 502 connects the user terminal 30 to a mobile phone network, and makes and receives phone calls.

The image processor 503 generates an image to display on a display 551, and displays the generated image on the display 551. For example, the image processor 503 receives information such as HTML data and image data constituting a webpage including the product information discussed earlier, or HTML data and image data constituting a webpage that accepts a product purchase, from the electronic shopping mall server 10 via the communication module 501, and displays on the display 551 information such as a screen that describes a product or a screen that accepts purchase of the product.

The audio processor 504 acquires and plays back audio data from the storage 507 or the electronic shopping mall server 10 so that audio is output from a speaker 552. When the telephony module 502 makes a phone call, the audio processor 504 converts the user's voice and the like picked up by a microphone 553 into a digital audio signal using an A/D (Analog/Digital) converter, and inputs the digital audio signal into the controller 508. The controller 508 controls the telephony module 502 to transmit the generated digital audio signal to the terminal of the person on the phone. Also, when the telephony module 502 receives a phone call, the audio processor 504 converts digital audio data acquired by the telephony module 502 into an analog signal using a D/A (Digital/Analog) converter, and outputs playback audio of the analog signal from the speaker 552.

The I/O module 505 is equipped with an interface that connects a removable memory card to the user terminal 30.

The input device 506 is equipped with an interface that accepts input from the user. In the present embodiment, the input device 506 is equipped with hardware buttons, as well as a touch panel stacked with the display 551.

The storage 507 is equipped with storage devices such as ROM and RAM, and stores information such as an operating system that controls the user terminal 30, various programs, image data, audio data, and text data.

The controller 508 is equipped with a CPU, and controls the user terminal 30 overall.

For the user terminal 30, a device such as a mobile phone, a smartphone, a typical personal computer having communication functions, a mobile terminal, or a tablet device may be used. In the present embodiment, a smartphone is adopted as the user terminal 30.

Note that the store terminal 20 is equipped with a communication module that includes a NIC, an image processor connected to a display, an audio processor connected to a speaker, an I/O module that includes a USB (Universal Serial Bus) interface, storage that includes a hard disk, ROM, and RAM, and a controller that includes a CPU. In the present embodiment, a typical personal computer is adopted as the store terminal 20, and detailed description thereof is omitted.

Next, an image displayed on the display 551 of the user terminal 30 and a process of the user terminal 30 displaying an image will be described.

Figure 6:
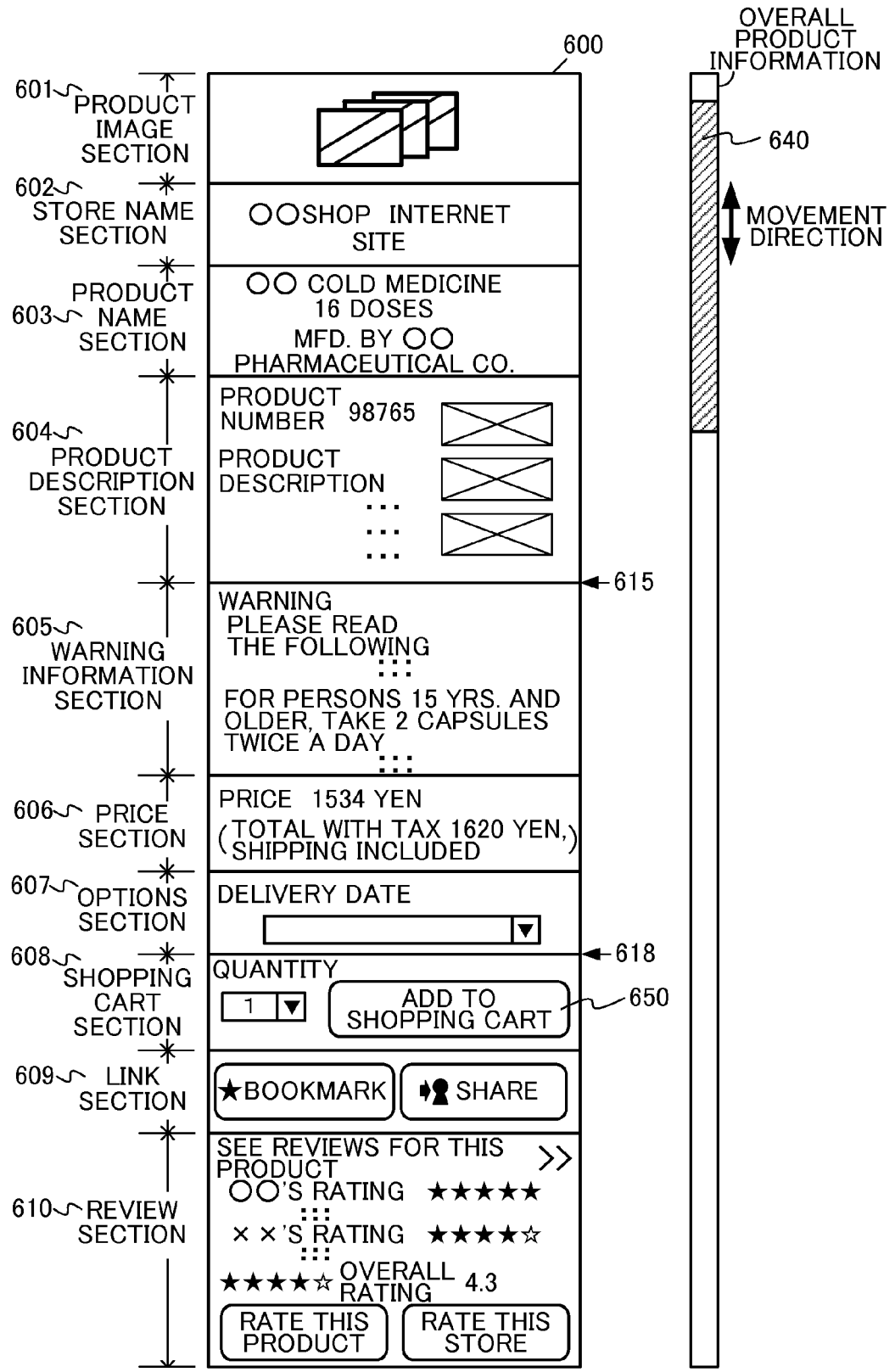
FIG. 6 is a diagram illustrating an example of an image expressing product information.

FIG. 6 illustrates an example of an image 600 expressing product information, generated by the image processor 503 and the controller 508. The image 600 is divided into multiple sections. In the present embodiment, the image 600 is divided into a product image section 601, a store name section 602, a product name section 603, a product description section 604, a warning information section 605, a price section 606, an options section 607, a shopping cart section 608, a link section 609, and a review section 610.

In the product image section 601, a photograph depicting the product, an illustration related to the product, or the like is displayed.

In the store name section 602, the name of the store selling the product, introductory text about the store, or the like is displayed.

In the product name section 603, the name of the product, the manufacturing company, or the like is displayed.

In the product description section 604, a description of the product is displayed.

In the warning information section 605, warning information that the user must read before selling the product to the user is displayed.

In the price section 606, the sale price of the product is displayed.

In the options section 607, options for the time when the user desires to receive the product are displayed. Typically, options are presented with a pull-down menu. However, the content of the options and the way of presenting options is not limited to the above.

The shopping cart section 608 includes an order object 650 that accepts a purchase order for the product from the user, and a field specifying the quantity to purchase. If the order object 650 is operated by the user, the controller 508 transitions to a screen that accepts a purchase order for the product.

In the present embodiment, the order object 650 is a software button, and when the order object 650 is pressed, the controller 508 adds the product to the user's purchase list, and transmits the purchase list to the electronic shopping mall server 10. After that, the electronic shopping mall server 10 and the user terminal 30 conduct a product purchase process.

In the link section 609, a button that accepts an instruction to register the webpage expressing the product information in the bookmarks or the like of a browser (software for viewing webpages), a button giving an instruction to share information with another user, or the like are displayed.

In the review section 610, ratings and comments by users who previously purchased the product are displayed.

The size of the image 600 is large enough to not be fully displayed all at once on the display 551 of the user terminal 30. For this reason, the user terminal 30 displays the portion of the entire image 600 included in the display range 640, and displays the image 600 in a scrollable manner.

The controller 508, after acquiring the product information, generates the image 600 expressing the product information, and displays the image 600 in order starting from the product image section 601.

Figure 7A:
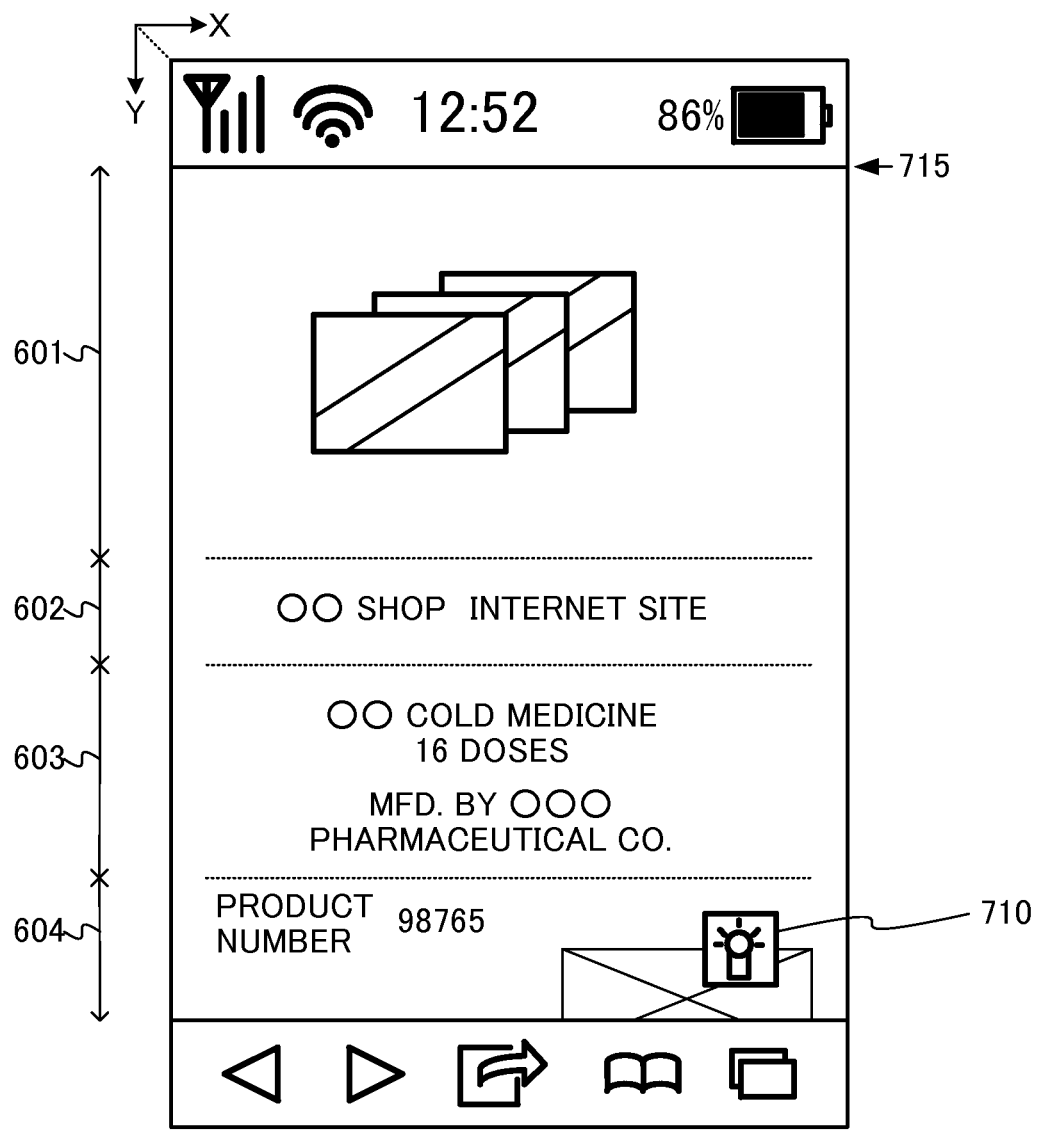
FIG. 7A is a diagram illustrating an image expressing product information and a first object.

For example, as illustrated in FIG. 7A, from among the entire image 600 expressing the product information, the controller 508 displays the product image section 601, the store name section 602, the product name section 603, and part of the product description section 604. Since the size of the image 600 is large, the controller 508 is unable to display the remaining part of the product description section 604 as well as the warning information section 605, the price section 606, the options section 607, the shopping cart section 608, the link section 609, and the review section 610. If instruction input indicating scrolling (in the present embodiment, a flick operation on the touch panel) is received from the user, the controller 508 moves the display range 640 of the entire image 600 to display on the display 551 in a direction indicated by the instruction input (the direction of the flick).

Figure 7B:
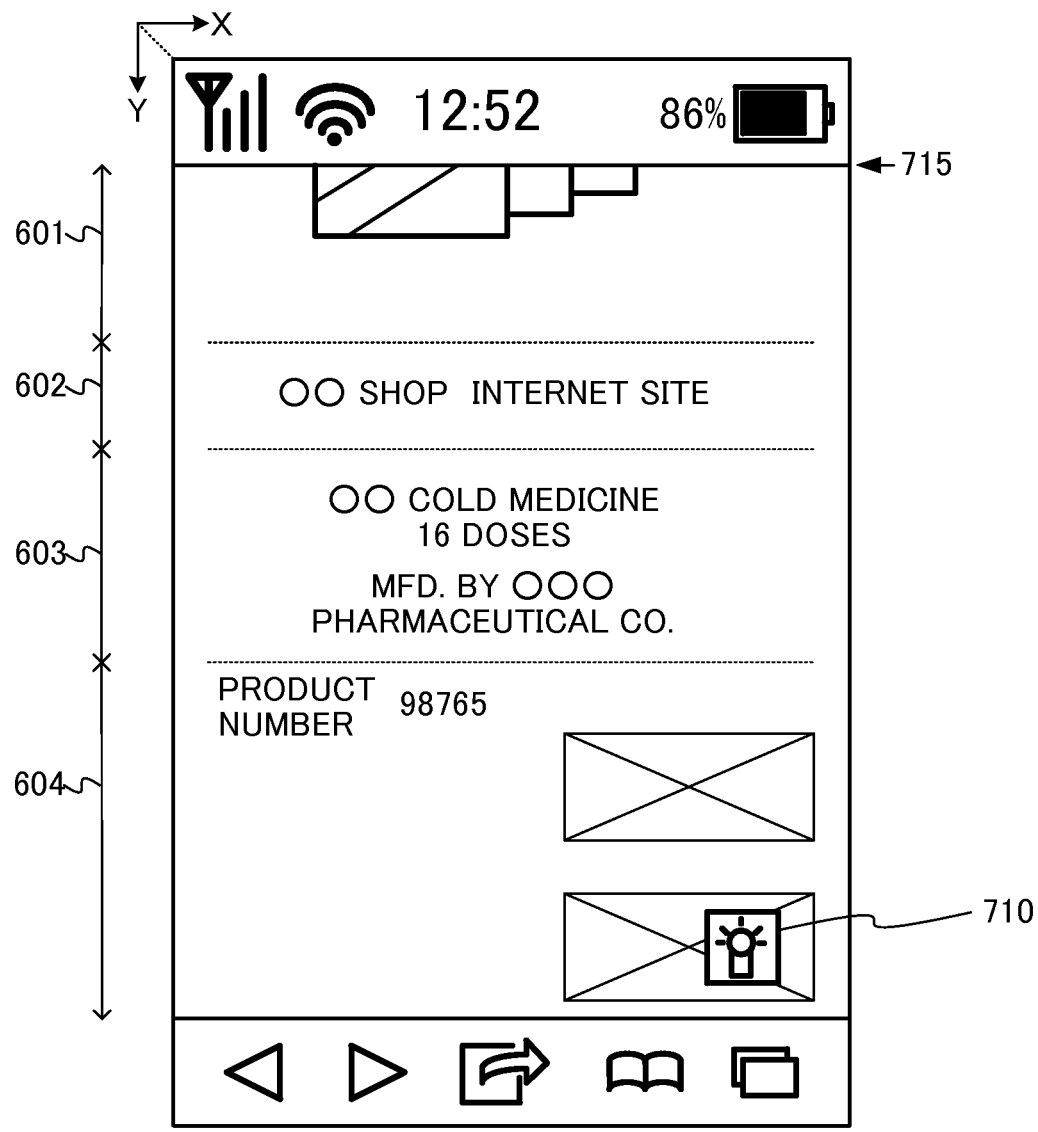
FIG. 7B is a diagram illustrating an image expressing product information and a first object after scrolling.

FIG. 7B illustrates an example display of the image 600 expressing the product information after scrolling downward slightly. The controller 508, on the basis of the instruction input from the user, calculates the movement amount and the movement direction of the display range 640, and moves the display range 640. On the display 551, the image 600 is displayed in a scrollable manner according to the instruction input from the user.

In the present embodiment, the scrollable directions are only the up and down directions facing the display 551, or in other words, the direction from the product image section 601 to the review section 610, or the direction from the review section 610 to the product image section 601. However, an image may also be scrollable in the left and right directions facing the display 551.

In addition, the controller 508 superimposes onto the image 600 expressing the product information a first object 710 that accepts an instruction to move the display range 640 to a position where the warning information section 605 is included.

Figure 8:
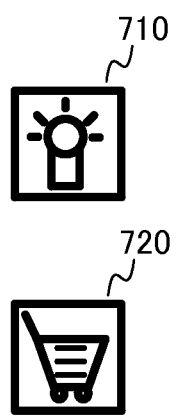
FIG. 8 is a diagram illustrating a first object and a second object.

FIG. 8 illustrates an example of the first object 710. The size, shape, color, and design of the first object 710 are arbitrary, but should minimally interfere with the user's viewing of the image 600 expressing the product information.

As demonstrated by a comparison of the display of the image 600 before scrolling illustrated in FIG. 7A and the display of the image 600 after scrolling illustrated in FIG. 7B, the display position of the first object 710 is fixed relative to the screen (the display area of the browser). For example, the position of the first object 710 is specified in advance by defining an XY coordinate system with an origin at the upper-left of the display area of the display 551, and specifying an X coordinate and a Y coordinate.

The display position of the first object 710 is not affected by scrolling of the image 600 expressing the product information. Even if the image 600 is scrolled, the first object 710 is always displayed in the same position.

For example, the controller 508 displays the first object 710 at a fixed position superimposed onto the image 600 by specifying a position property in combination with a value of "absolute", "relative" or "fixed" in CSS (Cascading Style Sheets). Note that the controller 508 displays the first object 710 in the uppermost layer.

Figure 9:
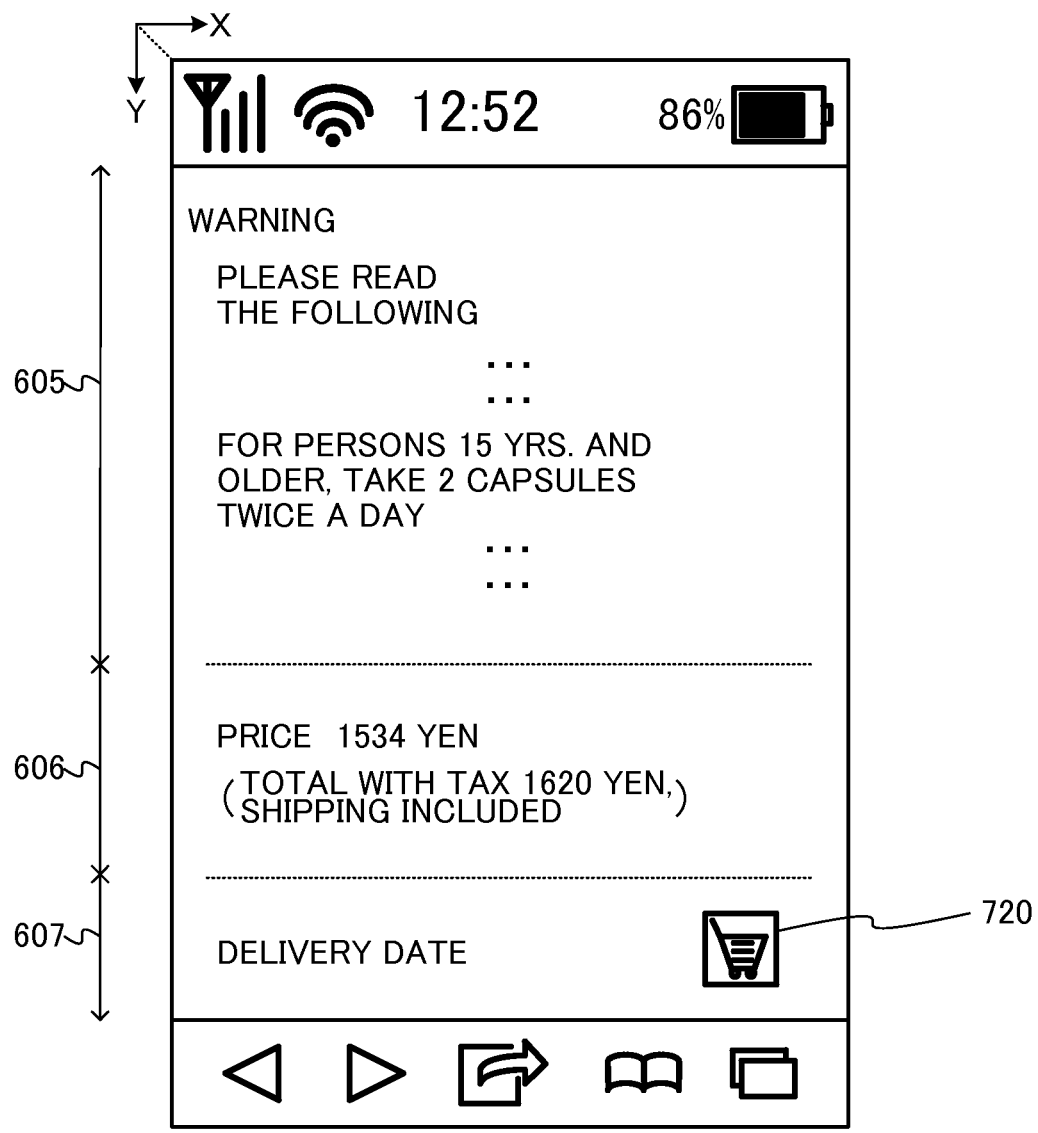
FIG. 9 is a diagram illustrating an image expressing product information and a second object.

The first object 710 is a software button. If the first object 710 is operated by the user, or in other words, if the user touches the portion of the touch panel where the first object 710 is displayed, the controller 508 moves the display range 640, and as illustrated in FIG. 9, places the top 615 of the warning information section 605 at the top 715 of the browser display area.

In other words, to see the warning information section 605, the user may use flick operations to scroll through the product image section 601, the store name section 602, the product name section 603, the product description section 604, and the warning information section 605 in order from the top, but may also scroll automatically to the warning information section 605 by operating the first object 710.

If the first object 710 is operated by the user, the controller 508 moves the display range 640 to a position where the warning information section 605 is included, and in addition, removes the first object 710, and displays a second object 720 superimposed onto the image 600.

After scrolling to the warning information section 605 after the first object 710 is operated, and additionally displaying all of the warning information, the controller 508 estimates that the user has read the warning information displayed in the warning information section 605.

Even if not all of the warning information is displayed at once, if all of the warning information is displayed successively by scrolling, the controller 508 estimates that the user has read the warning information displayed in the warning information section 605.

If the product is a special product, the electronic shopping mall system 1 does not allow the user to purchase the product until after the user has read the warning information. The controller 508, after estimating that the user has read the warning information displayed in the warning information section 605, enables operation of the order object 650, and accepts a purchase order for the product by the user. While it is estimated that the warning information has not been read, operation of the order object 650 is disabled.

Figure 10:
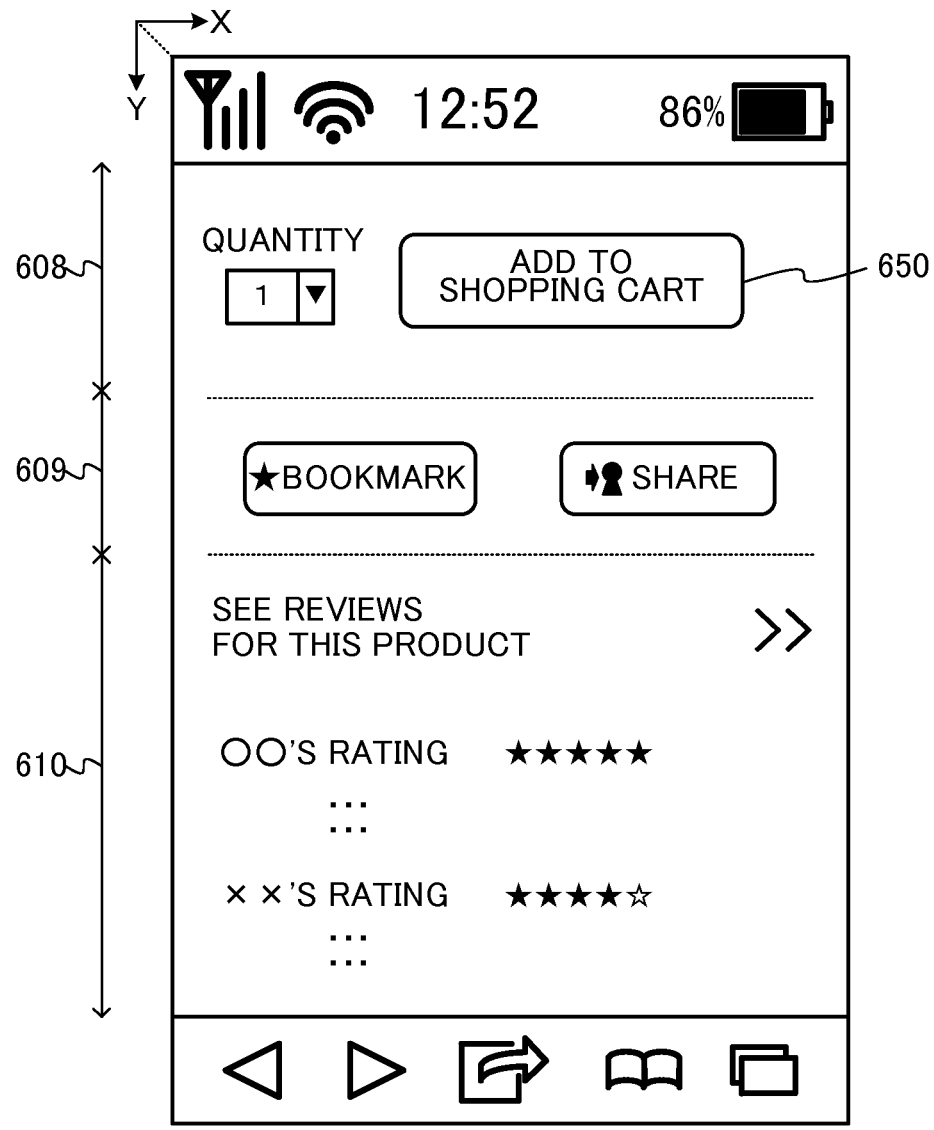
FIG. 10 is a diagram illustrating an order object.

The second object 720 is also a software button. If the second object 720 is operated by the user, or in other words, if the user touches the portion of the touch panel where the second object 720 is displayed, the controller 508 moves the display range 640, and as illustrated in FIG. 10, places the top 618 of the shopping cart section 608 at the top 715 of the browser display area.

FIG. 8 illustrates an example of the second object 720. The size, shape, color, and design of the second object 720 are arbitrary, but should minimally interfere with the user's viewing of the image 600 expressing the product information.

The display position of the second object 720 is fixed relative to the screen, similarly to the first object 710. The position of the second object 720 is specified in advance by specifying an X coordinate and a Y coordinate.

The display position of the second object 720 is not affected by scrolling of the image 600 expressing the product information. The second object 720 is always displayed in the same position.

Similarly to the first object 710, for example, the controller 508 displays the second object 720 at a fixed position superimposed onto the image 600 by specifying a position property in combination with a value of "absolute", "relative" or "fixed" in CSS. Note that the controller 508 displays the second object 720 in the same layer as the first object 710, or in the uppermost layer.

If the second object 720 is operated by the user, the controller 508 moves the display range 640 to a position where the order object 650 in the shopping cart section 608 is included, and also removes the second object 720.

If the order object 650 is operated by the user, the controller 508 acquires a webpage that accepts a purchase order for the product, and transitions to a screen that accepts a purchase order for the product.

Obviously, the user is able to move the display range 640 to the warning information section 605 even without operating the first object 710. As illustrated in FIGS. 7A and 7B, the controller 508 displays the image 600 expressing the product information in order starting from the product image section 601. The user scrolls and views the image 600 expressing the product information in order from the beginning. The controller 508 displays the first object 710 superimposed onto the image 600 expressing the product information.

After reaching the warning information section 605 and displaying all of the warning information in the warning information section 605, the controller 508 estimates that the user has read the warning information displayed in the warning information section 605. The controller 508 removes the first object 710, and displays the second object 720 superimposed onto the image 600 expressing the product information.

Also, the user is able to move the display range 640 to the shopping cart section 608 even without operating the second object 720. The controller 508 displays the second object 720 while the order object 650 of the shopping cart section 608 is not included inside the display range 640, but the controller 508 does not display the second object 720 while the order object 650 of the shopping cart section 608 is included inside the display range 640, as illustrated in FIG. 10.

Figure 11:
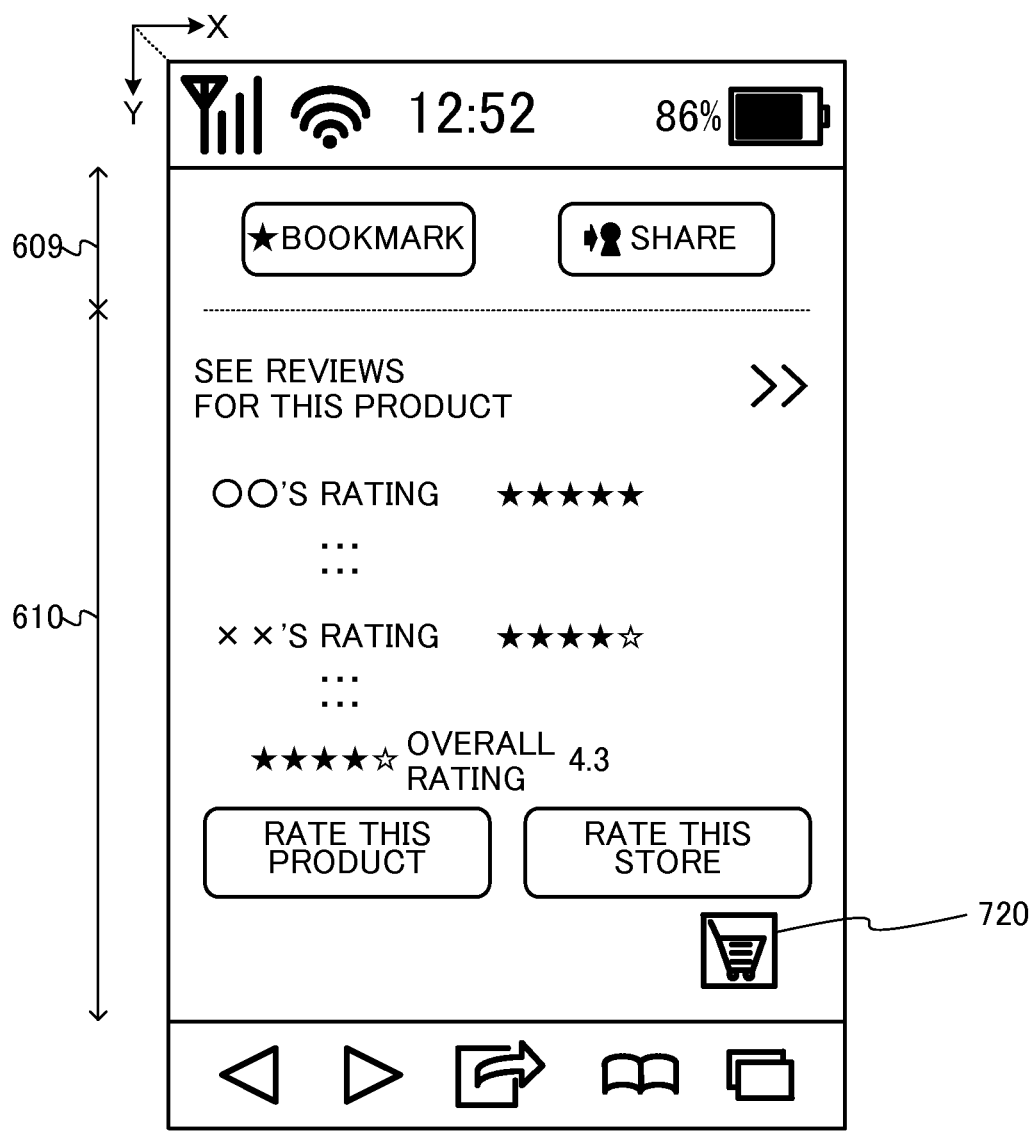
FIG. 11 is a diagram illustrating an image expressing product information and a second object.

For example, the image 600 is displayed in order from the product image section 601, and the first object 710 is displayed until the warning information section 605 is reached. Upon reaching the warning information section 605, it is estimated that the warning information has been read, the first object 710 is removed, and the second object 720 is displayed. The image 600 is scrolled farther, and upon reaching the shopping cart section 608, the order object 650 is displayed, and the second object 720 is removed. If the image 600 is scrolled farther and the order object 650 is no longer displayed, the second object 720 is displayed again, as illustrated in FIG. 11.

Note that if the product information is presented by HTML data, the controller 508 may configure the first object, the second object, and the order object as objects such as links or buttons, or by using an HTML element assigned with an "onclick" attribute.

Figure 12:
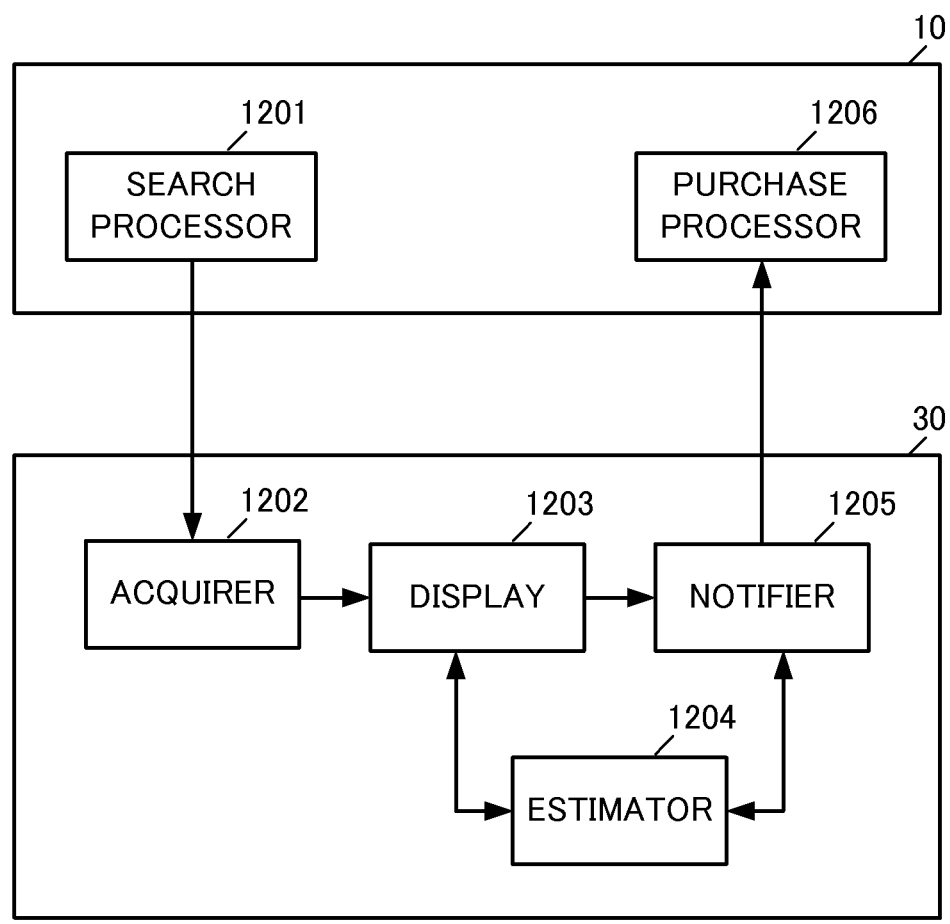
FIG. 12 is a diagram illustrating a functional configuration of an electronic shopping mall system.

Next, a functional configuration of the electronic shopping mall system 1 will be described using FIG. 12.

A search processor 1201 receives from a user a request for the transmission of product information, searches the product database 251 for the requested product information, and transmits a result to the user terminal 30. The storage 201, communication module 202, and controller 203 cooperate to function as the search processor 1201.

Resources for providing a webpage expressing the product information to the user terminal 30 are managed by the electronic shopping mall server 10. The search processor 1201 of the electronic shopping mall server 10 receives from a user terminal 30 a request for the transmission of product information, retrieves product information from the product database 251, and transmits the product information to the relevant user terminal 30.

An acquirer 1202 acquires product information from the electronic shopping mall server 10 on the basis of a request from a user. The controller 508 of the user terminal 30 accesses a webpage on which a product is sold, and requests the electronic shopping mall server 10 to transmit the product information. The controller 508 acquires the product information from the electronic shopping mall server 10. The communication module 501 and the controller 508 cooperate to function as the acquirer 1202.

The display 1203 displays the product information acquired by the acquirer 1202 on the display 551 in a scrollable manner. As discussed earlier, the display 1203 displays the first object 710 or the second object 720 superimposed onto the image 600 expressing the product information. The image processor 503 and the controller 508 cooperate to function as the display 1203.

An estimator 1204 estimates whether or not the user has read the warning information included in the product information displayed on the display 551. The estimator 1204 estimates that the user has read the warning information after all of the warning information in the warning information section 605 is displayed, and estimates that the user has not read the warning information if some or all of the warning information is not yet displayed. The controller 508 functions as the estimator 1204.

Depending on the estimation result from the estimator 1204, the display of the first object 710 or the second object 720 by the display 1203 changes.

In other words, while the estimator 1204 is estimating that the warning information has not been read, the display 1203 displays the first object 710 superimposed onto the image 600 expressing the product information displayed on the display 551.

If the first object 710 is operated by the user, the display 1203 scrolls the image 600 expressing the product information so that the warning information is displayed on the display 551.

Also, after the estimator 1204 estimates that the warning information has been read, the display 1203 displays the second object 720 superimposed onto the image 600 expressing the product information displayed on the display 551.

If the second object 720 is operated by the user, the display 1203 scrolls the image 600 expressing the product information so that the order object 650 is displayed.

If the estimator 1204 estimates that the warning information has been read, and in addition, the order object 650 included in the displayed product information is operated by the user, a notifier 1205 notifies the electronic shopping mall server 10 of a purchase order by the user for the product related to the product information. The communication module 501 and the controller 508 cooperate to function as the notifier 1205.

A purchase processor 1206 accepts the product purchase order, and executes a purchasing process. The purchase processor 1206 also performs functions such as accepting input of a product delivery destination, paying a product fee, and notifying the store. The storage 201, communication module 202, and controller 203 cooperate to function as the purchase processor 1206.

Next, a flow of the process of displaying product information (display process) conducted on the user terminal 30 will be described using the flowchart in FIG. 13. Herein, suppose that the product indicated by the product information is a special product requiring the user to read warning information before purchase.

First, the controller 508 acquires product information from the electronic shopping mall server 10 on the basis of a request from the user (step S1301).

The controller 508 generates the image 600 expressing the product information on the basis of the acquired product information, and displays the image 600 on the display 551 in a scrollable manner (step S1302). The user uses a browser to view the product information while scrolling.

The controller 508 estimates whether or not the user has read the warning information (step S1303). If all of the warning information included in the warning information section 605 has been displayed on the display 551 at least once, the controller 508 estimates that the user has read the warning information, whereas if some or all of the warning information has never been displayed on the display 551, the controller 508 estimates that the user has not read the warning information.

At this point, the controller 508 may also estimate that the user has read the warning information if the length of time of displaying the warning information is equal to or greater than a predetermined length, and estimate that the user has not read the warning information if the length of time of displaying the warning information is less than the predetermined length. This is because there is a high probability that the warning information actually has not been read if the warning information is displayed only momentarily. The controller 508 may also add displaying the warning information for at least a fixed amount of time to the conditions for estimating that the user has read the warning information.

If it is estimated that the user has not read the warning information (step S1303; No), the controller 508 displays the first object 710 superimposed onto the image 600 expressing the product information (step S1304). The position of the first object 710 is fixed relative to the screen, and is not affected by scrolling of the image 600 expressing the product information.

The controller 508 determines whether or not the user has operated the first object 710 (step S1305). If the user has not operated the first object 710 (step S1305; No), the process returns to step S1303. If the user has operated the first object 710 (step S1305; Yes), the controller 508 moves the display range 640 to a position where the warning information is displayed on-screen (step S1306).

In the present embodiment, the controller 508 scrolls and displays the image 600 expressing the product information, smoothly moving the display range 640 to a position where the warning information is displayed on-screen. In a situation in which the image 600 expressing the product information is configured as illustrated in FIG. 6, and in addition, the product image section 601, the store name section 602, the product name section 603, and part of the product description section 604 are being displayed as illustrated in FIGS. 7A and 7B, if the user operates the first object 710, the controller 508 scrolls to display the remaining part of the product description section 604 that is not being displayed, and additionally scrolls to where the warning information section 605 is displayed. The sections from the product image section 601 to the warning information section 605 are displayed sequentially, and there is no section that is not displayed along the way.

The scrolling speed of the image 600 expressing the product information is arbitrary. The controller 508 may scroll the image 600 at a predetermined speed, and may also scroll the image 600 at a speed specified by the user.

In addition, the controller 508 may make the speed of scrolling the image 600 fixed or variable. The controller 508 may scroll the image 600 expressing the product information by using an arbitrary function F(Y) that determines the scrolling speed.

Figure 14:
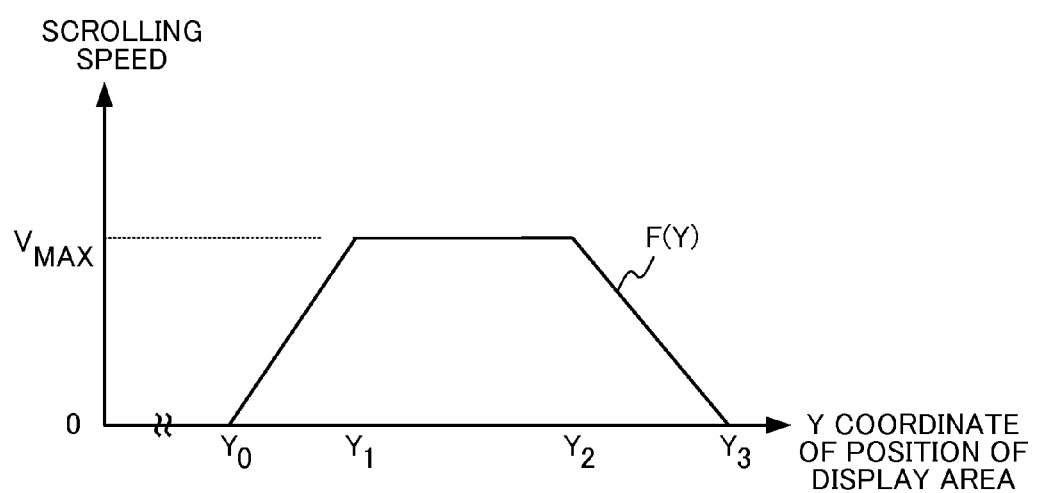
FIG. 14 is a diagram illustrating an example of scrolling speed.

For example, as illustrated in FIG. 14, an acceleration is applied from zero and the speed gradually increases, with the speed reaching a maximum at a position Y1 after moving a certain distance, and upon reaching a position Y2 at which the distance to the warning information section 605 becomes less than or equal to a predetermined value, an acceleration is applied in the opposite direction and the speed gradually decreases, with the speed becoming zero upon reaching the position Y3 of the warning information section 605. The controller 508 varies the speed while scrolling from the initial position Y0 before the first object 710 is operated, to the position Y3 of the warning information section 605. Scrolling may be conducted without making the user uncomfortable.

While scrolling the image 600 expressing the product information before reaching the warning information section 605, there may be posted information that draws the user's attention. Consequently, the user may be enabled to stop or pause scrolling as appropriate.

Specifically, while the first object 710 is being operating by the user, typically while the user is touching the area of the touch panel where the first object 710 is being displayed, the controller 508 may scroll the image 600 expressing the product information in the direction leading to the warning information section 605. Also, while the first object 710 is not being operating by the user, typically while the user is not touching the area of the touch panel where the first object 710 is being displayed, the controller 508 may stop scrolling.

For example, while the first object 710 is being touched with a finger, the image 600 automatically scrolls in the direction leading to where the warning information is posted, and if the finger is removed, the scrolling stops, or the scrolling speed gradually approaches zero. If the first object 710 is touched with a finger again, scrolling is resumed. By simply touching or removing a finger from the touch panel, the user is able to automatically scroll to where the warning information is posted. At this point, the user is not required to specify the scrolling direction. The user is not only able to easily move to where the warning information is posted, but also appropriately view information that draws the user's attention.

Note that the controller 508 may also not scroll the image 600 expressing the product information, and instead discontinuously jump directly to the warning information section 605 without displaying the information along the way.

Next, in step S1303, if it is estimated that the user has read the warning information (step S1303; Yes), the controller 508 displays the second object 720 superimposed onto the image 600 expressing the product information (step S1307).

In the present embodiment, the position of the first object 710 and the position of the second object 720 are taken to be the same. Consequently, if the first object 710 was being displayed in step S1304, in step S1307, the first object 710 is removed, and the second object 720 is displayed instead.

Figure 15:
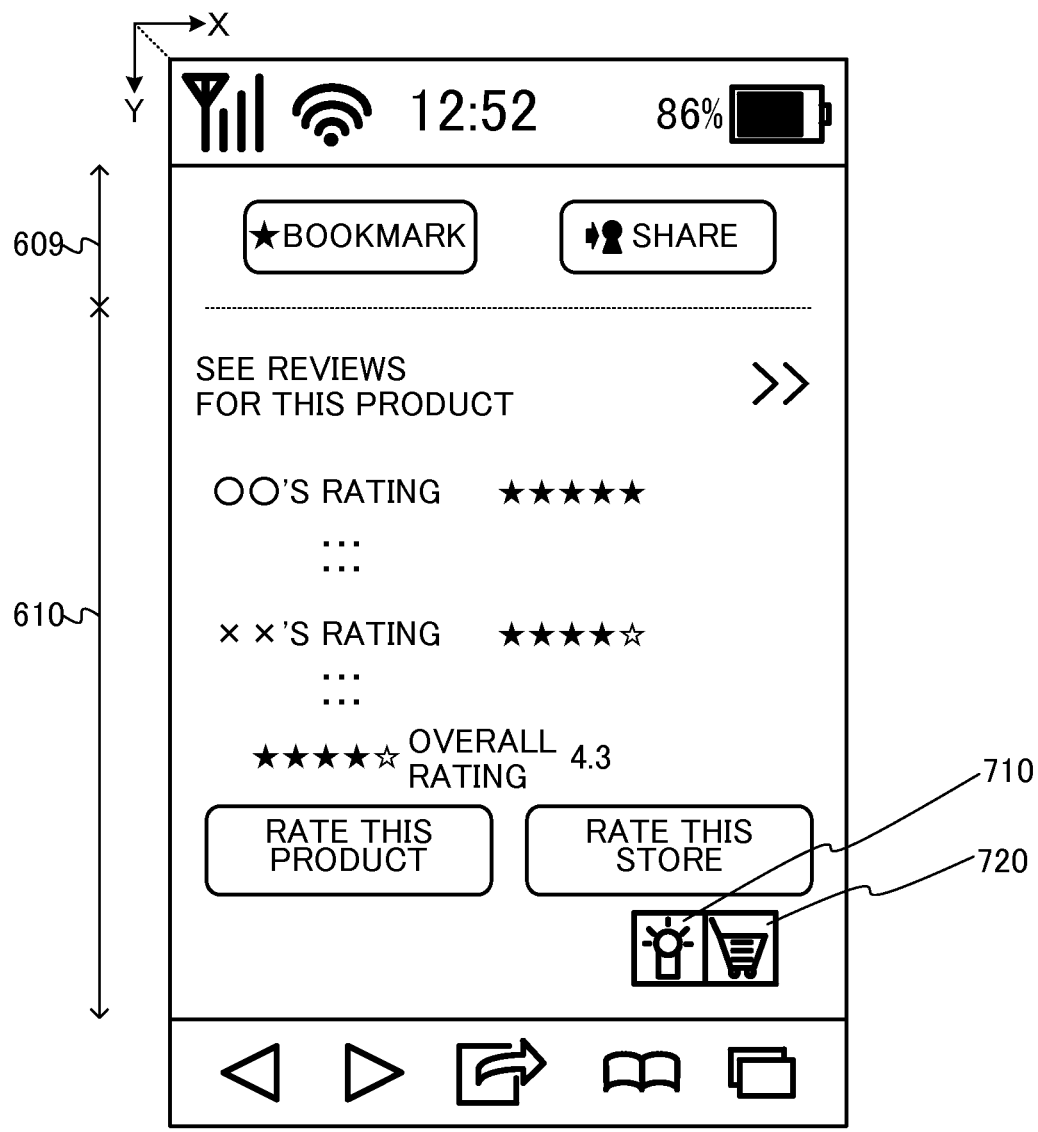
FIG. 15 is a diagram illustrating an image expressing product information, a first object, and a second object.

Note that, as illustrated in FIG. 15, the controller 508 may also be configured to differentiate the position of the first object 710 and the position of the second object 720, and display both at the same time. Typically, the controller 508 may display the first object 710 and the second object 720 beside each other at positions that minimally interfere with the viewing of the image 600 expressing the product information. As a result, the user is able to easily read the warning information again, even after reading the warning information a first time.

Next, the controller 508 determines whether or not the user has operated the second object 720 (step S1308).

If the user has not operated the second object 720 (step S1308; No), the process proceeds to step S1310 discussed later. If the user has operated the second object 720 (step S1308; Yes), the controller 508 moves the display range 640 of the image 600 expressing the product information to a position where the order object 650 is displayed (step S1309).

The method of scrolling in response to the user operating the second object 720 is the same as the method of scrolling in response to the user operating the first object 710. The controller 508 smoothly scrolls the display range 640 to the position where the warning information is displayed. The scrolling speed is arbitrary. Also, the scrolling speed may be a fixed value or a variable value. Furthermore, while the user is operating the second object 720, the controller 508 may scroll the image 600 expressing the product information in the direction leading to the shopping cart section 608, and while the user is not operating the second object 720, the controller 508 may stop scrolling, or gradually bring the scrolling speed to zero.

After moving the display range 640 to a position where the order object 650 is displayed, the controller 508 removes the second object 720. This is because the order object 650 is already being displayed.

After the second object 720 is removed, if the order object 650 stops being displayed on-screen because of a user operation, the controller 508 displays the second object 720 again.

The controller 508 determines whether or not the user has operated the order object 650 (step S1310). In the present embodiment, the controller 508 determines that the user has operated the order object 650 if the area of the touch panel where the order object 650 is displayed is touched with a finger or the like.

If it is determined that the user has not operated the order object 650 (step S1310; No), the process returns to step S1307. If it is determined that the user has operated the order object 650 (step S1310; Yes), the controller 508 transitions to a screen that accepts a purchase order for the product (step S1311), and conducts a product purchase process (step S1312).

In the product purchase process, the user terminal 30 conducts various processing in conjunction with the electronic shopping mall server 10, such as accepting an order for the product, accepting input of a product delivery destination, and paying a product fee.

In this way, according to the present embodiment, the electronic shopping mall system 1 is able to provide warning information that should be known by the user before the user purchases a product, without imposing an excessive burden on the user. The user terminal 30 is able to guide the user to the warning information in response to the user operating the first object 710. In addition, the user terminal 30 enables the user to easily reach a screen for purchasing the product in response to the user operating the second object 720, thereby encouraging purchase of the product.

In the present embodiment, the two different objects of the first object 710 and the second object 720 are prepared. However, a single, common object that acts as the first object 710 and the second object 720 may also be prepared, so that the common object is displayed instead of the first object 710 in step S1304, and the common object is displayed instead of the second object 720 in step S1307.

Additionally, while it is estimated that the user has not read the warning information, the controller 508 may treat the process to execute when the common object is operated as a process that scrolls to the warning information section 605, whereas after it is estimated that the user has read the warning information, the controller 508 may treat the process as a process that transitions to a screen that accepts a purchase order.

Embodiment 2

Next, another embodiment will be described. In the case in which the product information is provided to the user as a webpage displayed by a browser, there is a possibility that the display will start from an arbitrary section of the image 600 expressing the product information, as a result of a directly specified URL (Uniform Resource Locator). For example, if an image 600 indicating the product information is structured as illustrated in FIG. 6, and in addition, a link to a URL specifying the position of the shopping cart section 608 is traversed, the order object 650 will be displayed without displaying the warning information section 605. However, in the case of the special product, it is not preferable for the user to operate the order object 650 without reading the warning information. Accordingly, the present embodiment stipulates a process in the case in which the user operates the order object 650 while it is estimated that the user has not read the warning information.

When the order object 650 is displayed even though it is estimated that the user has not read the warning information, the controller 508 changes the process associated with the order object 650 from a process that transitions to a screen that accepts a purchase order to a process that moves the display range 640 to a position where the warning information section 605 is displayed.

In other words, if it is estimated that the user has not read the warning information, and in addition, the order object 650 is operated, the image 600 expressing the product information scrolls to the warning information section 605.

A label attached to the order object 650 may also be changed from a label that includes text guiding the user to a product purchase screen (for example, "Add to shopping cart") to a label that includes text guiding the user to read the warning information (for example, "WARNING").

The controller 508 may also change features such as the color, design, and size of the order object 650 on the basis of an estimation result of whether or not the user has read the warning information.

Subsequently, after it is estimated that the user has read the warning information, the controller 508 changes the process associated with the order object 650 from a process that moves the display range 640 to a position where the warning information section 605 is displayed to a process that transitions to a screen that accepts a purchase order.

If it is estimated that the user has read the warning information, and in addition, the order object 650 is operated, the controller 508 transitions to a screen that accepts a purchase order for the product (step S1311), and conducts a product purchase process (step S1312), similarly to the embodiment discussed earlier.

Note that the controller 508 may also be configured to not display the order object 650 if the shopping cart section 608 is displayed while it is estimated that the user has not read the warning information.

According to the present embodiment, the electronic shopping mall system 1 is able to provide information that should be notified to the user before the user purchases a product, without imposing an excessive burden on the user.

Embodiment 3

Next, another embodiment will be described. There is a possibility that a user will repeatedly purchase the same product. However, in the case of a special product that requires the user to read warning information before purchasing, making the user read the same warning information over and over may become a large burden on the user. Accordingly, in the electronic shopping mall system 1 according to the present embodiment, if a certain condition is satisfied, a purchase order for the product is enabled, and a purchase process is executed, even if the user has not read the warning information.

The controller 508 of the user terminal 30 receives the input of a user ID and a password from the user, and transmits the user ID and password to the electronic shopping mall server 10. The controller 203 of the electronic shopping mall server 10 authenticates the user by comparing the received user ID and password to a user ID and password registered in advance. This user authentication is conducted before step S1301 discussed earlier.

If both the user ID and password match, the controller 203 of the electronic shopping mall server 10 determines that the user is a valid member, and accepts a purchase order for the product. If one or both of the user ID and password do not match, the controller 203 determines that the user is not a valid member, and does not accept a purchase order for the product.

As discussed earlier, the storage 201 of the electronic shopping mall server 10 stores the purchase history database 252. The controller 203 of the electronic shopping mall server 10 acquires, from the purchase history database 252, data indicating a purchase history associated with the user ID determined to be a valid member.

Additionally, the controller 203 of the electronic shopping mall server 10 determines, on the basis of the acquired purchase history, whether or not the user corresponding to the user ID has purchased the product indicated by the product information requested for transmission by the user terminal 30 within a fixed period of the past.

The fixed period of the past is determined in advance by the controller 203, and may be within one month going back from the time at which the transmission of the product information was requested, for example. The length of the period is arbitrary.

The controller 203 of the electronic shopping mall server 10, on the basis of the acquired purchase history, calculates the length of time that has elapsed since the time at which the product was last purchased. If the calculated length of time is equal to or greater than a predetermined length, the controller 203 estimates that the user has not read the warning information. If the calculated length of time is less than the predetermined length, the controller 203 estimates that the user has read the warning information.

For example, provided that the fixed period discussed above is "one month", if the same user has purchased the same product within the last one month, it is estimated that the user has read the warning information. However, if the same user has not purchased the same product within the last one month, it is estimated that the user has not read the warning information.

The controller 203 of the electronic shopping mall server 10 transmits to the user terminal 30 a determination result of whether or not the user has purchased the product within a fixed period of the past. Typically, the data indicating the determination result is transmitted together with the requested product information by the electronic shopping mall server 10, and received by the user terminal 30, in step S1301 discussed earlier.

The controller 508 of the user terminal 30, on the basis of the data indicating the determination result, estimates whether or not the user has read the warning information. In other words, if the user has purchased the product indicated by the product information within the fixed period of the past, the controller 508 displays the second object 720 superimposed onto the image 600 expressing the product information (step S1307), whereas if the user has not purchased the product indicated by the product information within the fixed period of the past, the controller 508 displays the first object 710 superimposed onto the image 600 expressing the product information (step S1304).

Note that the process after the first object 710 or the second object 720 is displayed is the same as the embodiment discussed earlier.

According to the present embodiment, the electronic shopping mall system 1 is able to make the user read warning information, and improve the advantageous effect of not imposing an excessive burden on the user.

Embodiment 4

Next, another embodiment will be described. In Embodiment 3, the electronic shopping mall server 10 determines whether or not the user has purchased the product within the fixed period of the past. However, the user terminal 30 may also determine whether or not the user has purchased the product within the fixed period of the past, on the basis of the purchase history.

In step S1301, the electronic shopping mall server 10 transmits product information together with data indicating a purchase history to the user terminal 30. The user terminal 30 receives the product information together with the data indicating the purchase history from the electronic shopping mall server 10.

Subsequently, in step S1303, the controller 508 of the user terminal 30 determines whether or not the user has purchased the product within a fixed period of the past, on the basis of the received purchase history.

The user terminal 30 may also store data indicating a purchase history. When transmitting the purchase order for the product to the electronic shopping mall server 10 in step S1311, the controller 508 of the user terminal 30 may also store the user ID and product code in association with each other in the storage 507. Subsequently, the controller 508 may determine whether or not the user has purchased the product within the fixed period of the past, on the basis of the purchase history stored in the storage 507.

According to the present embodiment, the processing load on the electronic shopping mall server 10 may be reduced.

Embodiment 5

Next, another embodiment will be described. There is a possibility that the content of the warning information may be updated by the administrator of the electronic shopping mall system 1 or the manager of the store selling the product. Immediately after the warning information is updated, there is a high possibility that even a user who frequently purchases the same product has not read the updated warning information. Accordingly, in the electronic shopping mall system 1 of the present embodiment, it is estimated whether or not the user has read the warning information, on the basis of whether or not the warning information has been updated.

Figure 16:
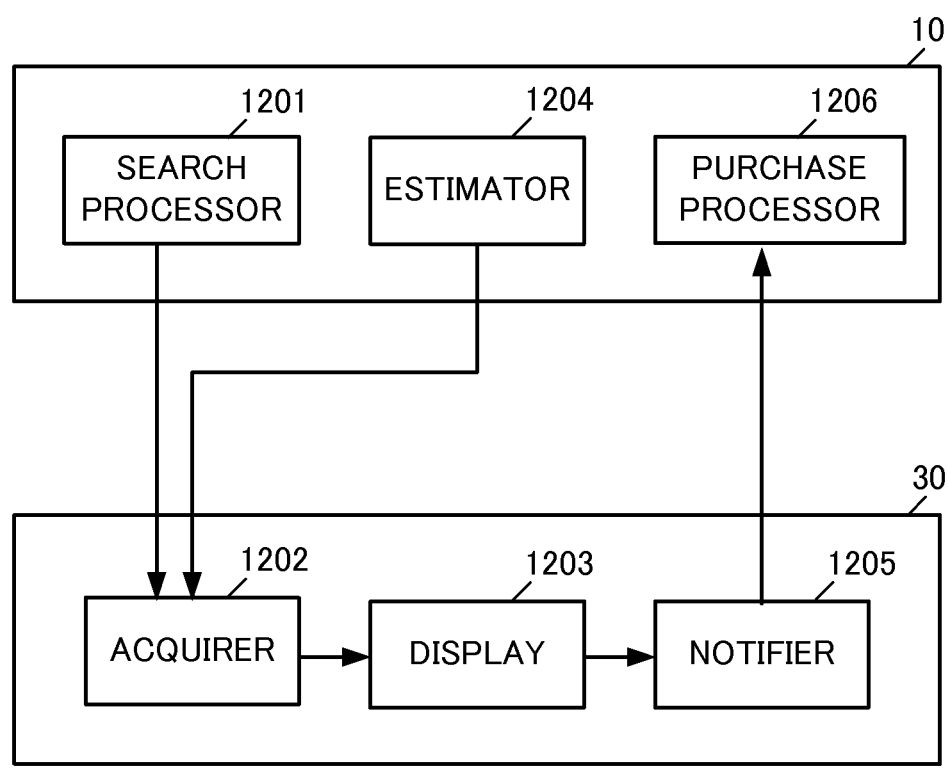
FIG. 16 is a diagram illustrating a functional configuration of an electronic shopping mall system.

FIG. 16 illustrates a functional configuration of the electronic shopping mall system 1 according to the present embodiment. FIG. 16 differs from FIG. 12 in that the estimator 1204 is included in the electronic shopping mall server 10 rather than the user terminal 30.

If warning information is updated, the estimator 1204 estimates that the user has not read that warning information. The storage 201 and the controller 203 cooperate to function as the estimator 1204.

If warning information is updated, the controller 203 of the electronic shopping mall server 10 estimates that the user has not read the warning information irrespectively of the purchase history, even if it is determined that the user has purchased the product indicated by the product information requested for transmission within the fixed period of the past.

As illustrated in the unread/read table 1700 of FIG. 17, the storage 201 of the electronic shopping mall server 10 stores, for each special product, the user ID in association with a flag indicating whether or not the user has read the warning information, and a time when the flag was last updated. The controller 203 updates the unread/read table 1700 as needed.

When a product is first offered for sale, the controller 203 configures the flag associated with all users to a value indicating "unread".

When a purchase order for the product is received, the controller 203 updates the flag corresponding to the user ID with the purchase order to a value indicating "read".

If the warning information is updated, the controller 203 updates the flag associated with all users to a value indicating "unread", irrespectively of the time when the flag was last updated.

In step S1301 discussed earlier, if the transmission of product information is requested, the controller 203 of the electronic shopping mall server 10 reads out the value of the flag associated with the user ID transmitted from the user terminal 30 that transmitted the request, and determines whether or not the user has read the warning information. Subsequently, the controller 203 transmits the product information together with data indicating the determination result to the user terminal 30.

The controller 508 of the user terminal 30 receives the product information together with the data indicating the determination result, and on the basis of the determination result, displays the first object 710 or the second object 720. In other words, if a value indicating that the user has read the warning information is set in the flag, the controller 508 displays the second object 720 superimposed onto the image 600 expressing the product information (step S1307), whereas if a value indicating that the user has not read the warning information is set in the flag, the controller 508 displays the first object 710 superimposed onto the image 600 expressing the product information (step S1304).

According to the present embodiment, the electronic shopping mall system 1 is able to centrally manage whether or not the user has read the warning information.

Note that the value of the flag may also be updated when a notification is received indicating that the user is estimated to have read the warning information, rather than when there is a purchase order for the product.

For example, if it is estimated that the user has read the warning information, the controller 508 of the user terminal 30 notifies the electronic shopping mall server 10 that the user has read the warning information, and also transmits the user ID. The timing of this notification may be arbitrary, and irrespective of whether or not the order object 650 is operated.

Subsequently, the controller 203 of the electronic shopping mall server 10 receives the notification, and updates the unread/read table 1700. Also, the controller 203 records the time of receiving the notification as the update time.

By making the timing of the notification arbitrary, the user becomes able to read the warning information in advance when the user has extra time, and later purchase the product without reading the warning information again.

The present disclosure is not limited to the foregoing embodiments, and various modification and applications are possible. Moreover, it is also possible to freely combine the respective structural elements of the foregoing embodiments.

As illustrated in the unread/read table 1800 of FIG. 18, the storage 507 of the user terminal 30 may also store, for each special product, the product code in association with the flag indicating whether or not the user has read the warning information, and a time when the flag was last updated.

The controller 508 updates the unread/read table 1800 on the basis of an estimation result of whether or not the user has read the warning information.

Subsequently, in step S1303, the controller 508 calculates the length of time from the time when the flag was last updated indicated in FIG. 18 up to the present, and if the calculated length of time is equal to or greater than a predetermined length, the controller 508 estimates that the user has not read the warning information. On the other hand, if the calculated length of time is less than the predetermined length, the controller 508 estimates that the user has read the warning information.

Figure 13:
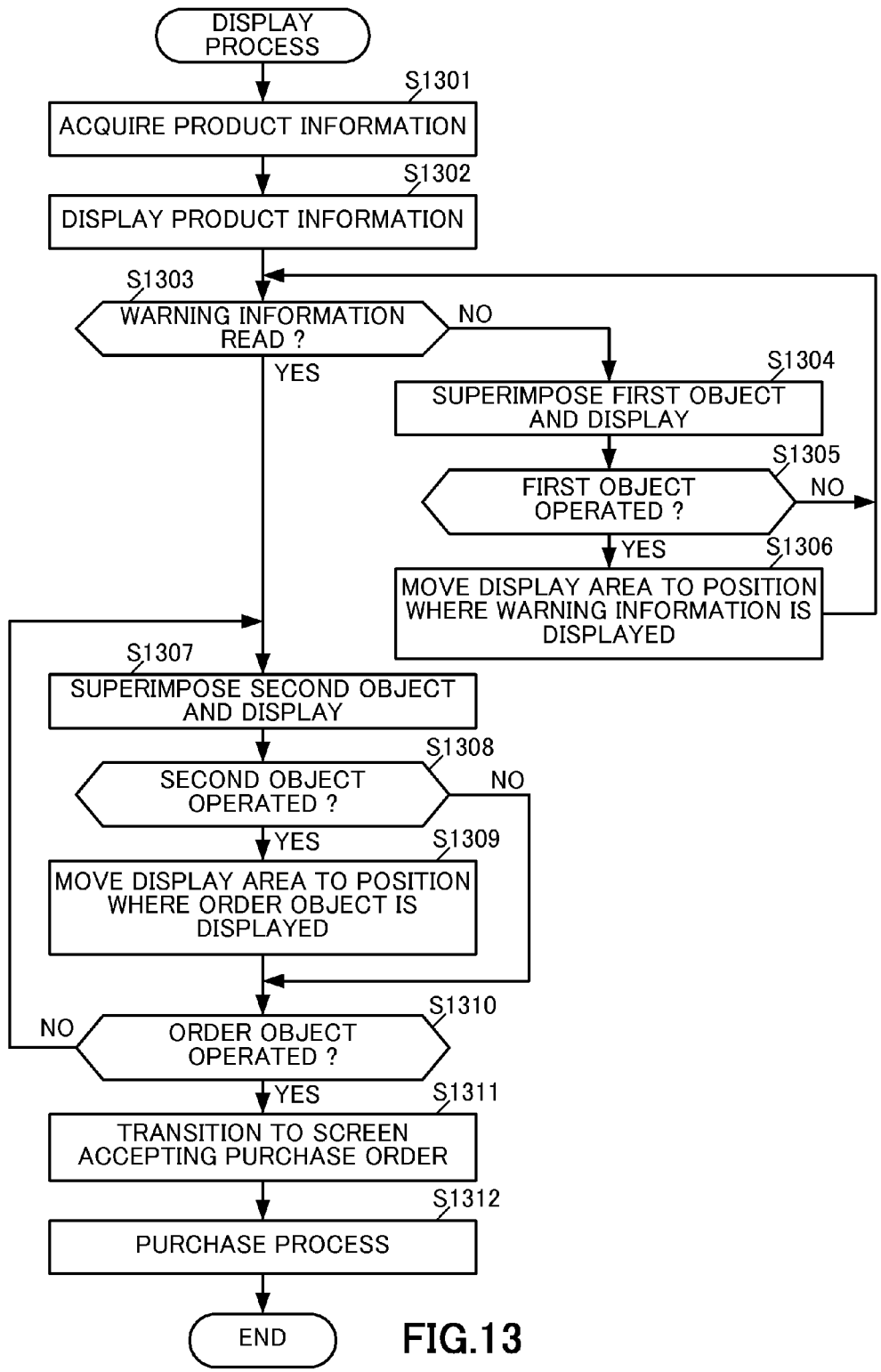
FIG. 13 is a flowchart for describing a display process.

When the user terminal 30 displays a webpage including product information for the first time, the controller 508 may execute the display process illustrated in FIG. 13, whereas when displaying the webpage for the second and subsequent times, the controller 508 may always displays the first object 710 and/or the second object 720.

The controller 508 may also change the process associated with the second object 720 to notifying the electronic shopping mall server 10 of a purchase order for the product indicated by the product information, instead of moving the display range 640 to a position where the order object 650 is included. In other words, the process associated with the second object 720 may be the same as the process associated with the order object 650.

For example, product information for which the user has not read the warning information is displayed in order from the product image section 601, and the product information is displayed together with the first object 710 until the warning information section 605 is reached. Upon reaching the warning information section 605, it is estimated that the warning information has been read, the first object 710 is removed, and the second object 720 is displayed. A user wanting to purchase the product may scroll farther to the order object 650 and operate the order object 650, or operate the second object 720 without scrolling.

A program for causing a computer to operate as some or all of the electronic shopping mall system 1 may be distributed by being stored on a non-transitory computer-readable recording medium such as a memory card, a CD (Compact Disc), a DVD (Digital Versatile Disk), or a MO (Magneto-Optical Disk). Such a program may be installed on a separate computer and cause operation of the means discussed earlier, or cause execution of the process steps discussed earlier.

Furthermore, a program may be stored on a disk device or the like included in a server on the Internet, in which the program is modulated onto a carrier wave and downloaded or the like to a computer, for example.

According to the present disclosure, it is possible to provide an electronic shopping mall system, a terminal, a display control method, a non-transitory recording medium, and a program suited to encouraging a user to purchase a product while also providing the user with warning information to be noticed before the purchase of the product.

REFERENCE SIGNS LIST 1 electronic shopping mall system
10 electronic shopping mall server
20, 20A, 20B, 20C store terminal
30, 30A, 30B, 30C user terminal
50 communication network
201 storage
202 communication module
203 controller
251 product database
252 purchase history database
501 communication module
502 telephony module
503 image processor
504 audio processor
505 I/O module
506 input device
507 storage
508 controller
551 display
552 speaker
553 microphone
600 image expressing the product information
640 display range
650 order object
710 first object
720 second object
1201 search processor
1202 acquirer
1203 display
1204 estimator
1205 notifier
1206 purchase processor

The invention claimed is:

1. An electronic shopping mall system comprising:
at least one server in communication with a display, an estimator, and a notifier;
a display configured to, on the basis of a request from a user, display product information acquired from the server on a screen in a scrollable manner;
an estimator configured to estimate whether or not the user had read warning information included in the product information displayed on the screen; and
a notifier configured to, when it is estimated that the warning information has been read, and in addition, an order object included in the product information displayed on the screen is operated by the user, notify the server of a purchase order by the user for a product related to the product information;
wherein
the display is further configured to display a first object superimposed onto the product information displayed on the screen while it is estimated that the warning information has not been read, and if the first object displayed on the screen is operated by the user, the display scrolls the product information so that the warning information is displayed on the screen, and
the display is further configured to display a second object superimposed onto the product information displayed on the screen while it is estimated that the warning information has not been read, and if the second object displayed on the screen is operated by the user, the display scrolls the product information so that the order object is displayed on the screen.

2. The electronic shopping mall system according to claim 1, wherein
the display is further configured to display the first object and the second object at a fixed position relative to the screen.

3. The electronic shopping mall system according to claim 1, wherein
the display is further configured to scroll the product information so that the warning information is displayed on the screen and removes the first object if the first object is operated by the user.

4. The electronic shopping mall system according to claim 3, wherein
the display, after removing the first object, is further configured to display the second object on the screen.

5. The electronic shopping mall system according to claim 1, wherein
the display is further configured to remove the first object and display the second object at the same position as a position where the first object had been displayed if it is estimated that the user had read the warning information.

6. The electronic shopping mall system according to claim 1, wherein
the display does not display the second object while the order object is being displayed, and is further configured to display the second object while the order object is not being displayed.

7. The shopping mall system according to claim 1, wherein
if the user operated the order object while it is estimated that the warning information has not been read, the display is further configured to scroll the product information so that the warning information is displayed on the screen.

8. The electronic shopping mall system according to claim 1, further comprising:
purchase history storage that is configured to store a history of a product indicated by the product information and purchased by the user;
the estimator is further configured to:
on the basis of the history, calculate a length of time elapsing since a time when the product was last purchased;
if the calculated length of time is equal to or greater than a predetermined length, estimate that the user has not read the warning information;
if the calculated length of time is less than the predetermined length estimate that the user has read the warning information.

9. The electronic shopping mall system according to claim 1, wherein
the estimator is further configured to estimate that the user has not read the warning information if the warning information is updated.

10. A terminal comprising:
a display configured to, on the basis of a request from a user, display product information acquired from a server on a screen in a scrollable manner;
an estimator configured to estimate whether or not the user has read warning information included in the product information displayed on the screen; and
a notifier configured to, when it is estimated that the warning information has been read, and in addition, an order object included in the product information displayed on the screen is operated by the user, notify the server of a purchase order by the user for a product related to the product information;
wherein
the display is further configured to display a first object superimposed onto the product information displayed on the screen while it is estimated that the warning information has not beer read, and if the first object displayed on the screen is operated by a user, the display scrolls the product information so that the warning information is displayed on the screen, and
the display is further configured to display a second object superimposed onto the product information displayed on the screen after it is estimated that the warning information has been read, and if the second object is operated by the user, the display scrolls the product information so that the order object is displayed on the screen.

11. A display control method comprising:
displaying, by a display, on the basis of a request from a user, product information acquired from a server on a screen in a scrollable manner;
estimating, by an estimator, whether or not the user has read warning information included in the product information displayed on the screen; and
notifying, by a notifier, in response to the estimator estimating that the warning information has been read, and in addition, in further response to detecting that an order object included in the product information displayed on the screen is operated by the user, the server of a purchase order by the user for a product related to the product information;
wherein
in response to estimating that the user has not read the warning information, displaying on the screen a first object superimposed onto the product information displayed on the screen while it is estimated that the warning information has not been read, and responsive to a detection that the first object displayed on the screen is operated by the user, the displaying scrolls the product information so that the warning information is displayed on the screen, and
in response to estimating that the user had read the warning information, displaying on the screen a second object superimposed onto the product information displayed on the screen and responsive to a detection that the second object displayed on the screen is operated by the user, the displaying scrolls the product information so that the order object is displayed on the screen.

12. A non-transitory recording medium storing a computer-executable program configured to cause one or more computers to perform the functions comprising:
display, on the basis of a request from a user, product information acquired from a server on a screen in a scrollable manner;
estimate whether or not the user has read warning information included in the product information displayed on the screen; and
notify the server of a purchase order by the user for a product related to the product information when it is estimated that the warning information has been read and an order object included in the product information displayed on the screen is operated by the user;
wherein
in response to estimating that the user has not read the warning information, displaying on the screen a first object superimposed onto the product information displayed on the screen while it is estimated that the warning information has not been read, and responsive to a detection that the first object displayed on the screen is operated by the user, the display scrolls the product information so that the warning information is displayed on the screen, and
in response to estimating that the user had read the warning information, displaying on the screen a second object superimposed onto the product information displayed on the screen, and responsive to a detection that the second object displayed on the screen is operated by the user, the display scrolls the product information so that the order object is displayed on the screen.

* * * * *